United States Patent [19]

Lee

[11] Patent Number: 5,594,605
[45] Date of Patent: Jan. 14, 1997

[54] DAMPER FOR A CASSETTE HOLDER

[75] Inventor: Jin-Soo Lee, Kyungki-do, Rep. of Korea

[73] Assignee: Samsung Electronics Co., Ltd., Kyungki-do, Rep. of Korea

[21] Appl. No.: 429,550

[22] Filed: Apr. 27, 1995

[30] Foreign Application Priority Data

Jun. 9, 1994 [KR] Rep. of Korea ............... 94-13004

[51] Int. Cl.⁶ .................................... G11B 15/675
[52] U.S. Cl. .................................... 360/96.5
[58] Field of Search ..................... 360/96.5–96.6

[56] References Cited

U.S. PATENT DOCUMENTS

| | | | |
|---|---|---|---|
| 4,564,875 | 1/1986 | Ihara | 360/96.6 |
| 5,038,236 | 8/1991 | Nakahara et al. | 360/96.5 |
| 5,390,055 | 2/1995 | Maehara et al. | 360/85 |
| 5,500,778 | 3/1996 | Ahn | 360/96.5 |

*Primary Examiner*—John H. Wolff
*Attorney, Agent, or Firm*—Sughrue, Mion, Zinn, Macpeak & Seas

[57] ABSTRACT

A cassette holder damper, for providing a constant opening force of a cassette holder regardless of ambient temperature by utilizing a simple structure, includes a chassis on which an opening having an arc-shaped edge is formed and a damper mechanism comprising a casing member connected to one side of the holder and a roller member which rotates in contact with the arc-shaped edge of the chassis while being rotatably connected to the interior of the casing member. The cassette holder is smoothly opened by a frictional contact between the roller member and the arc-shaped edge of the chassis.

2 Claims, 4 Drawing Sheets

5,594,605

DAMPER FOR A CASSETTE HOLDER

BACKGROUND OF THE INVENTION

The present invention relates to a damper for a cassette holder and, more particularly, to a damper for a cassette holder whose structure is improved to be opened and closed by a constant opening force regardless of environmental influences such as temperature.

Generally, a rotary cassette loading device is adopted in a camcoder. FIG. 1 schematically shows this cassette loading device. Reference numeral 4 represents a chassis installed at both sides of a deck (not shown) on which a reel table for loading a reel of cassette (not shown) thereon are mounted. A holder 1 for receiving a cassette is rotatably connected to one end of chassis 4 by a hinge 7. Since holder 1 and chassis 4 are connected by a spring 13 as shown in FIG. 2, holder 1 is opened by the spring force as shown in FIG. 1. Reference numeral 1' denotes a protrusion extending from a lever 2 of holder 1, and reference numeral 4' denotes a protrusion extending from chassis 4.

Thus, locking means (not shown) should be comprised for loading a cassette received in the holder 1 onto the deck. When the locking means is released, the holder 1 is opened by the force of the spring 13. Here, since the spring force is strong, the holder 1 tends to slam open noisily and parts such as the hinge 7 are damaged.

To solve the above problems, a damper is adopted in a cassette loading device.

As shown in FIGS. 1–3, the damper comprises a casing 9 filled with a damping substance 10 such as oil, a rotary plate 12 rotating in a submerged state in the damping substance 10, and a cover 11 which is connected to casing 9.

Rotary plate 12 has a shaft 12' whose one end is supported by casing 9 and whose other end passes through cover 11. On the other hand, a hook 9' is formed on the casing 9 and a locking slot 2', which is connected with the hook 9', is formed on holder 1. Shaft 12' protrudes to the other side of holder 1 via a penetration opening 2" of holder 1.

A gear 8, which is connected with the shaft 12', is mounted on the other side of the holder 1. The gear 8 is installed to be meshed with a sector gear 6 formed in the chassis 4. Reference numeral 14 denotes a ring member for preventing the leakage of the damping substance 10.

The damper reduces the spring force using the damping substance 10 when the locking means is released and simultaneously the holder 1 is opened by the force of the spring 13. That is, when the holder 1 is opened, the gear 8 rotates counterclockwise while being meshed with the sector gear 6 and simultaneously the rotary plate 12 rotates counterclockwise while submerged in the damping substance 10. Here, the rotary speed of the gear 8 and the rotary plate 12 is decreased due to the rotary resistance caused by the viscosity of the damping substance 10 so that the holder 1 is opened more slowly.

However, the damper as described above has the following problems.

First, product reliability is reduced since the opening force of the holder varies due to inconsistent quantities of the damping substance 10 filling the casing 9.

Second, the opening force of the holder is different according to the ambient temperature, since the viscosity of the damping substance varies according to the temperature.

Third, the cost is high due to the many parts to be assembled.

SUMMARY OF THE INVENTION

To solve the above problems, it is an object of the present invention to provide a cassette holder damper whose structure is improved such that the opening force of the cassette holder is constant regardless of the influence of temperature.

To achieve the above object, according to the present invention, there is provided a rotary cassette loading device comprising a chassis; a cassette holder for receiving a cassette and which is rotatably connected to the chassis; a spring disposed between the chassis and the cassette holder and for normally biasing the cassette holder in an open position; and a damper for reducing an opening force of the spring acting on the cassette holder. The chassis is formed with an opening having an arc-shaped edge, and the damper comprises a casing member connected to one side of the cassette holder and a roller member which rotates in frictional contact with the arc-shaped edge of the opening while being rotatably connected to said casing member.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE PREFERRED EMBODIMENTS

Figure 1:
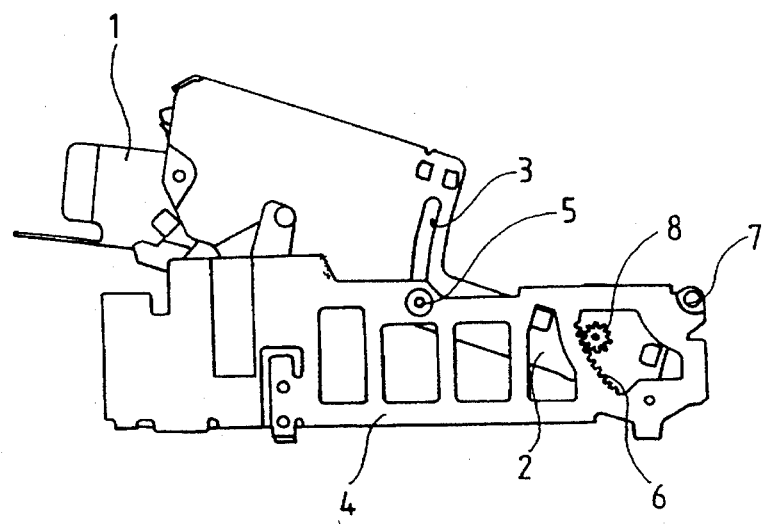
FIG. 1 is a schematic side view of a cassette player adopting a conventional damper.
Figure 2:
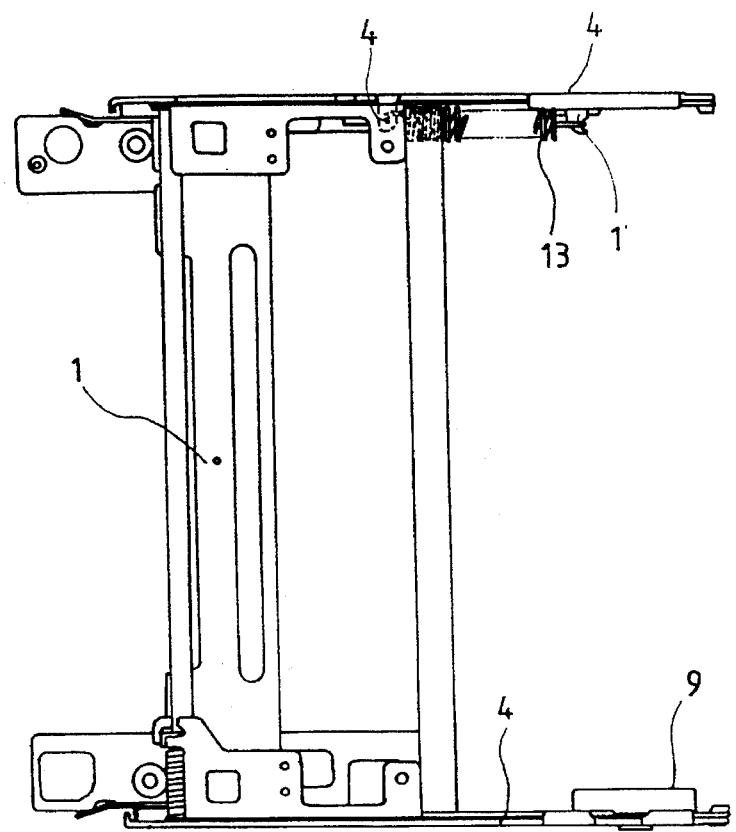
FIG. 2 is a schematic plan view of FIG. 1.
Figure 3:
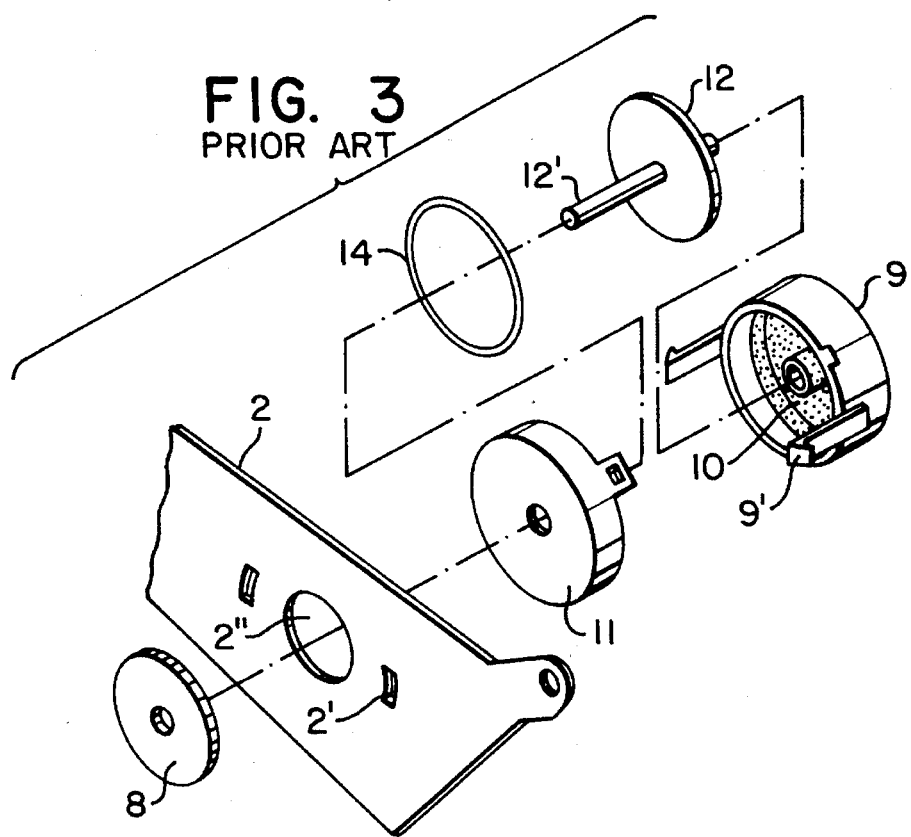
FIG. 3 is an exploded perspective view of a conventional damper.
Figure 4:
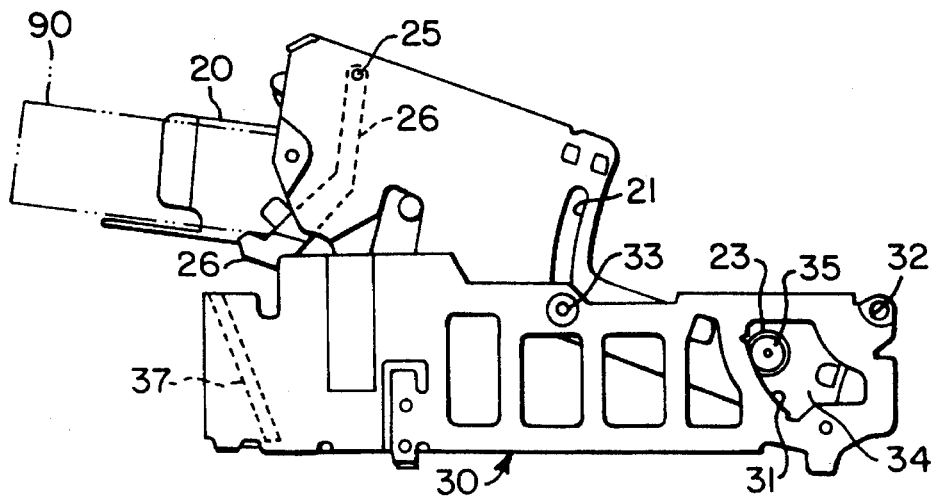
FIG. 4 is a schematic side view showing the state where the holder is opened in a cassette player utilizing a damper according to the present invention.
Figure 5:
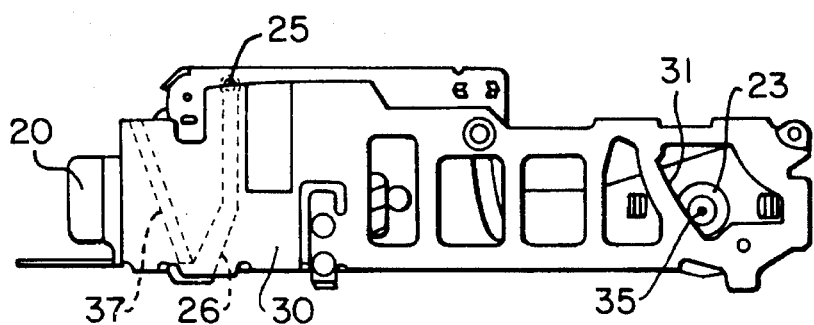
FIG. 5 is a schematic side view showing the state where the holder is closed in the cassette player of FIG. 4.
Figure 6:
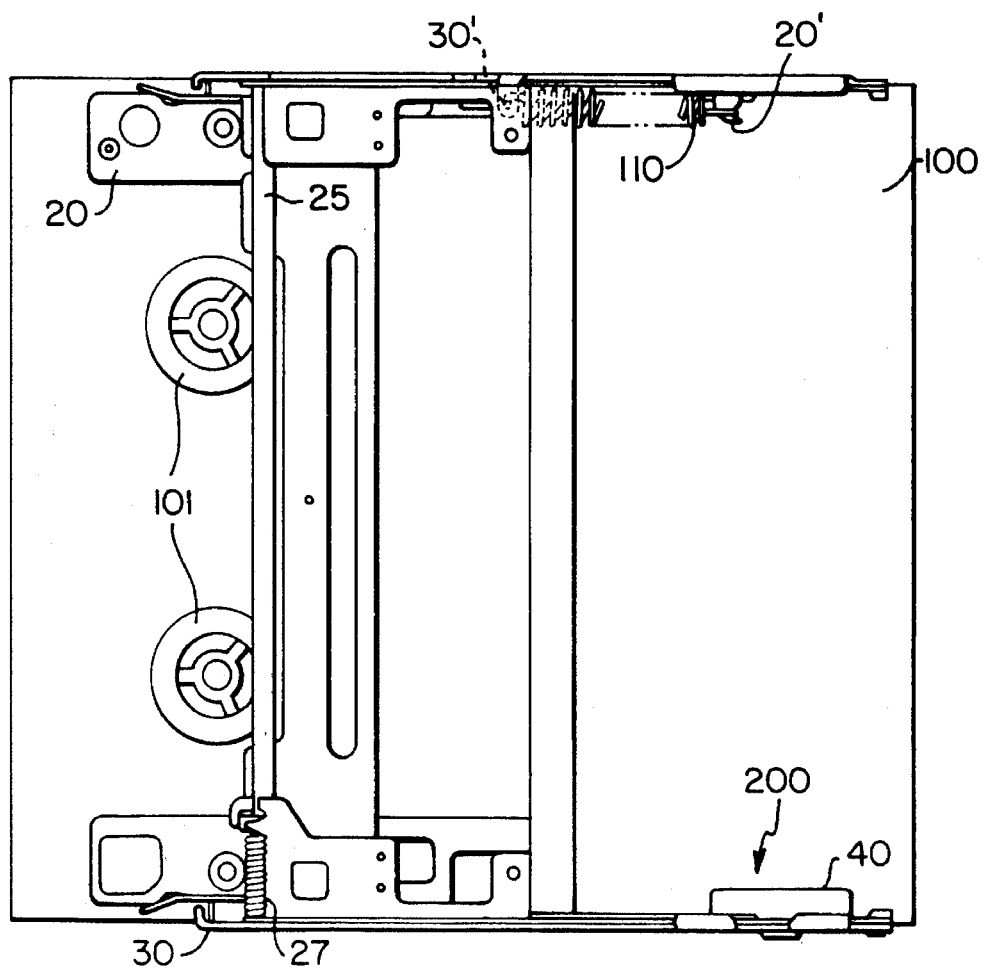
FIG. 6 is a schematic plan view of FIG. 5.

Referring to FIGS. 4–6 showing the cassette player utilizing a damper for a cassette holder according to the present invention, a chassis 30 is installed on both sides of a deck 100 on which is provided a reel table 101 for loading the reel of a cassette 90. A holder 20 for receiving the cassette is rotatably connected by a hinge 32 to the one end of the chassis 30. As shown in FIG. 6, since the holder 20 is connected to the chassis 30 and a spring 110, the holder 20 is always elastically biased in the opening direction as shown in FIG. 4. In FIG. 6, reference numeral 20' denotes a protrusion extended from the holder 20 and reference numeral 30' denotes a protrusion extended from the chassis 30.

Figure 7:
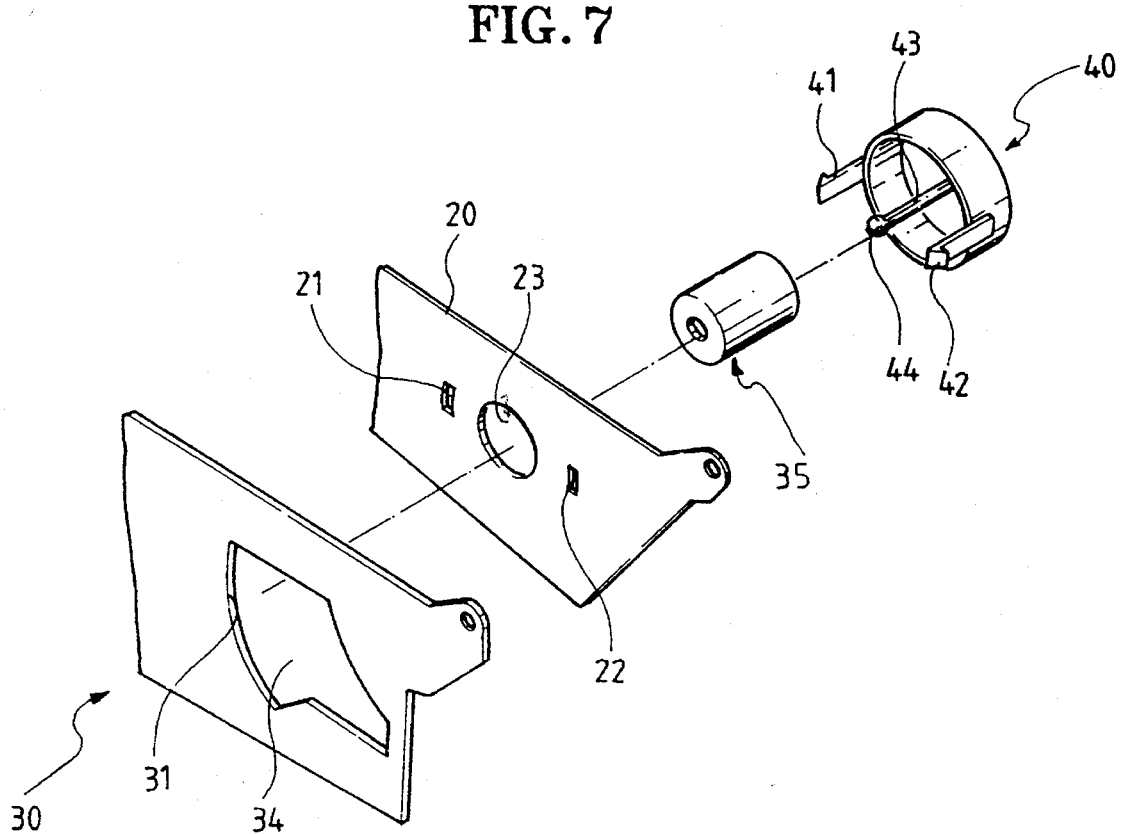
FIG. 7 is a schematic exploded perspective view of a damper according to the present invention.

As shown in FIG. 4, a guide slot 21 is formed on the side of the holder 20 and a guide pin 33 which is connected to guide slot 21 is formed on the chassis 30. The guide slot 21 and guide pin 33 are for stably guiding the rotation of holder 20. As shown in FIGS. 4 and 7, an opening 34 is formed in the chassis 30 and is adjacent to hinge 32. Reference numeral 31 represents a rounded or arc-shaped edge 31 of the opening 34.

A damper 200 according to the present invention is placed on the chassis 30 adjacent to hinge 32. As shown in FIG. 7, damper 200 comprises a casing member 40 which is connected to one side of the holder 20, and a roller member 35 which rotates in contact with the arc-shaped edge 31 of the chassis 30 while being rotatably connected to the interior of the casing member 40. The roller member 35 is preferably formed of a synthetic resin which can be elastically deformed.

Figure 8:
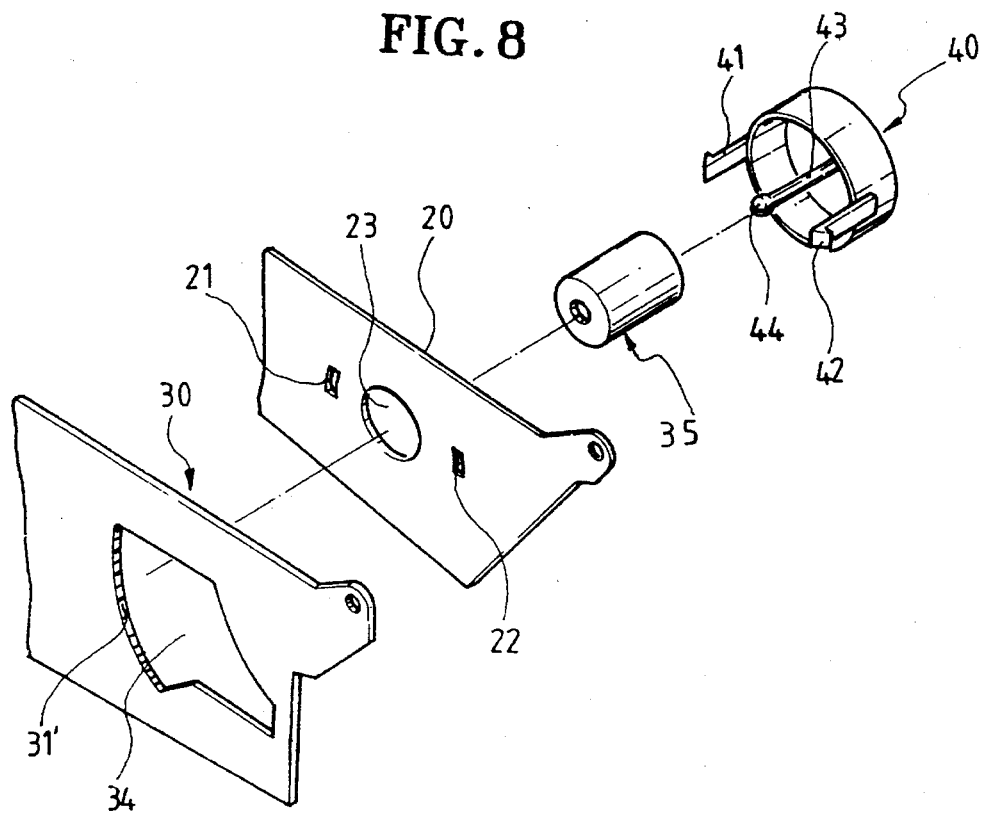
FIG. 8 shows another preferred embodiment of a damper according to the present invention.

On the other hand, as shown in FIG. 8, teeth may be formed along the arc-shaped edge 31 so as to form a toothed portion 31'. In this case, the roller member 35 rotates in contact with the toothed portion 31'. Thus, the roller member 35 can rotate without slippage.

As shown in FIG. 7, hooks 41 and 42 are formed on casing member 40 and locking slots 21 and 22 in which the hooks 41 and 42 are locked are formed on the holder 20. Also, a penetration opening 23 through which the roller member 35 passes is formed between the locking slots 21 and 22. A supporting shaft 43 for rotatably supporting the roller member 35 is installed inside the casing member 40. Also, a divided jaw 44 for preventing withdrawal of the roller member 35 is formed on the end of the supporting shaft 43.

The damper of the cassette holder having the above-described structure according to the present invention operates as follows.

As shown in FIG. 4, the cassette 90 is loaded onto the reel table 101 by rotating the holder 20 counterclockwise after the cassette 90 is loaded in the holder 20 in the state where the holder 20 is open by the force of the spring 110. The holder 20 is then locked in the chassis 30 by locking means in the closed position as shown in FIG. 5. The locking means includes a reinforcing shaft 25 which is installed in the holder 20, a lock 26 which is joined to the reinforcing shaft 25 so as to be elastically rotated by a spring 27, and a locking rib 37 formed in the chassis 30 (see FIGS. 4, 5 and 6). The lock 26 is designed to lock onto the locking rib 37. Also, when the holder 20 is rotating counterclockwise into the locked position, the roller member 35 rotates clockwise in contact with arc-shaped edge 31 and moves to the lower portion thereof.

As described above, the spring 110 is tensioned during the closing operation of the holder 20 and the holder 20 is locked in the state where spring 110 is tensioned.

Then, when the locking means is released so as to eject the cassette 90, the holder 20 is opened while rotating clockwise by the force of spring 110. Here, the roller member 35 rotates counterclockwise in contact with arc-shaped edge 31 and moves to the upper portion thereof. Also, since the roller member 35 rotates while being pressed against the arc-shaped edge 31 by the restoring force of the spring 110, the restoring force of the spring 110 is slightly reduced. As a result, the holder 20 is smoothly opened since the force of the spring 110 is reduced by the frictional force between the arc-shaped edge 31 and the roller member 35, and the elasticity of the roller member 35 itself.

Also, as shown in FIG. 8, since the frictional force between roller member 35 and the toothed portion 31' is increased in the case where the toothed portion 31' is formed on the arc-shaped edge 31, the restoring force of the spring 110 is further reduced. Therefore, the holder 20 is opened more smoothly.

As described above, the opening force of the holder 20 can be controlled by modifying the surface roughness of the arc-shaped edge 31 or by controlling the elastic hardness of the roller member 35.

The damper of the cassette holder according to the present invention has the following merits.

First, there is no concern about leakage since the conventional damping substance (oil) is not required.

Second, the opening force of the holder is constantly controlled for every unit manufactured since there is no concern about the change in the quantity of damping substance used and influences due to ambient temperature, which are caused by utilizing the damping substance.

Third, the assembly efficiency is improved due to the simple structure.

Fourth, noise is prevented since the roller member 35 for reducing the external vibration is employed.

As described above, the damper of the cassette holder according to the present invention provides a constant opening force of the holder by utilizing a simple structure, regardless of the influence of the ambient temperature, so that product reliability is increased.

It is contemplated that numerous modifications may be made to the cassette holder damper of the present invention without departing from the spirit and scope of the invention as defined in the following claims.

What is claimed is:

1. A rotary cassette loading device comprising a chassis; a cassette holder for receiving a cassette and which is rotatably connected to said chassis; a spring disposed between said chassis and said cassette holder and for normally biasing said cassette holder in an open position; and a damping liquid-free damper for reducing an opening force of said spring acting on said cassette holder, wherein said chassis is formed with an opening having an arc-shaped edge, and said damping liquid-free damper comprises a casing member connected to one side of said cassette holder, said casing member defining an interior having a fixed supporting shaft extending therefrom, and a synthetic resin roller member which elastically deforms and which rotates in frictional contact with said arc-shaped edge of said opening while being rotatably supported on said fixed supporting shaft within the interior of said casing member.

2. The device as claimed in claim 1, wherein said arc-shaped edge of said opening includes a plurality of teeth.

* * * * *